US011984684B2

(12) United States Patent
Thevenot

(10) Patent No.: US 11,984,684 B2
(45) Date of Patent: May 14, 2024

(54) THREE-PHASE ELECTRICAL CONNECTION SYSTEM

(71) Applicant: GULPLUG, Grenoble (FR)

(72) Inventor: Benoît Thevenot, Grenoble (FR)

(73) Assignee: OCCHIUTI & ROHLICEK LLP, Boston, MA (US)

( * ) Notice: Subject to any disclaimer, the term of this patent is extended or adjusted under 35 U.S.C. 154(b) by 192 days.

(21) Appl. No.: 17/610,744

(22) PCT Filed: May 7, 2020

(86) PCT No.: PCT/EP2020/062784

§ 371 (c)(1),
(2) Date: Nov. 12, 2021

(87) PCT Pub. No.: WO2020/229321

PCT Pub. Date: Nov. 19, 2020

(65) Prior Publication Data

US 2022/0239037 A1 Jul. 28, 2022

(30) Foreign Application Priority Data

May 15, 2019 (FR) ...................................... 1905071

(51) Int. Cl.
*H01R 13/62* (2006.01)
*H01R 13/631* (2006.01)
(Continued)

(52) U.S. Cl.
CPC ....... *H01R 13/6205* (2013.01); *H01R 13/631* (2013.01); *H01R 13/645* (2013.01); *H01R 24/86* (2013.01); *H01R 2105/00* (2013.01)

(58) Field of Classification Search
CPC .............. H01R 13/6205; H01R 13/631; H01R 13/645; H01R 24/86; H01R 2105/00
See application file for complete search history.

(56) References Cited

U.S. PATENT DOCUMENTS 5,829,987 A * 11/1998 Fritsch ............... H01R 13/7037 200/51.09
5,921,783 A * 7/1999 Fritsch ................ H01R 13/703 439/700
(Continued)

FOREIGN PATENT DOCUMENTS

EP 2667459 A1 11/2013
FR 3012263 A1 4/2015
(Continued)

*Primary Examiner* — Thanh Tam T Le
(74) *Attorney, Agent, or Firm* — Faustino A. Lichauco

(57) ABSTRACT

A three-phase electrical connection system includes a socket, a plug, and a two-part magnetic indexing device with two parts, one being fastened to the socket and the other being integral with the plug. Both parts have an annular yoke and a magnet set comprising three permanent magnets. The yoke comprises ferromagnetic material, an axis of revolution, and at least one revolution support face formed in a plane transverse to the axis of revolution. The face is divided into three distinct annular portions, each of which extends one-hundred and twenty degrees of arc. The three magnets are attached to a distinct annular portion of the yoke and are spaced from one another by a first non-zero angular interval. The magnets all have the same magnetic orientation parallel to the axis of revolution. The magnets of the two part are attracted to each other.

14 Claims, 9 Drawing Sheets

(51) Int. Cl.

| | |
|---|---|
| ***H01R 13/645*** | (2006.01) |
| ***H01R 24/86*** | (2011.01) |
| *H01R 105/00* | (2006.01) |

(56) References Cited

U.S. PATENT DOCUMENTS

| | | | | | |
|---|---|---|---|---|---|
| 6,966,781 | B1 * | 11/2005 | Bullinger | H01R 13/64 | 439/38 |
| 7,642,886 | B2 * | 1/2010 | Boss | F24C 7/083 | 200/341 |
| 7,775,801 | B2 * | 8/2010 | Shiff | H01R 13/6205 | 439/700 |
| 7,793,987 | B1 * | 9/2010 | Busch | A61M 16/161 | 285/9.1 |
| 8,348,678 | B2 * | 1/2013 | Hardisty | H01R 13/6205 | 439/39 |
| 8,440,945 | B2 * | 5/2013 | Blumenthal | G05G 1/08 | 219/625 |
| 8,608,502 | B2 * | 12/2013 | Witter | H01R 24/38 | 439/38 |
| 8,894,419 | B1 * | 11/2014 | Buelow | H02J 7/0045 | 439/39 |
| 9,093,237 | B2 * | 7/2015 | Bondar | H03K 17/97 | |
| 9,197,010 | B2 * | 11/2015 | Greig | B64D 11/0624 | |
| 9,496,642 | B1 * | 11/2016 | Fan | H01R 13/22 | |
| 9,559,477 | B2 * | 1/2017 | Liu | H01R 13/6205 | |
| 9,849,551 | B2 * | 12/2017 | Ebihara | B23B 31/28 | |
| 10,135,179 | B2 * | 11/2018 | Cooper | H01R 24/38 | |
| 10,302,306 | B2 * | 5/2019 | Bach | G05G 25/04 | |
| 10,348,024 | B2 * | 7/2019 | Yonnet | H01R 13/6205 | |
| 10,374,353 | B2 * | 8/2019 | Archuleta | H01F 7/0247 | |
| 10,447,262 | B2 * | 10/2019 | Bach | H03K 17/97 | |
| 10,658,785 | B2 * | 5/2020 | Pionetti | F16L 25/01 | |
| 10,674,619 | B1 * | 6/2020 | Heffner | H01R 13/6205 | |
| 10,880,633 | B2 * | 12/2020 | Saule | H04R 1/1025 | |
| 10,969,042 | B2 * | 4/2021 | Cuber | F16L 37/004 | |
| 11,050,187 | B2 * | 6/2021 | Trouffard | H01R 13/6205 | |
| 11,165,196 | B2 * | 11/2021 | Yonnet | H01R 13/631 | |
| 11,287,579 | B2 * | 3/2022 | Day | G02B 6/3886 | |
| 2011/0171837 | A1 | 7/2011 | Hardisty et al. | | |
| 2017/0256899 | A1 | 9/2017 | Mitchell | | |
| 2019/0009680 | A1 | 1/2019 | Kauffmann | | |

FOREIGN PATENT DOCUMENTS

| | | | |
|---|---|---|---|
| FR | 3072216 | A1 | 4/2019 |
| JP | 2009205912 | A | 9/2009 |
| WO | 2012032230 | A1 | 3/2012 |
| WO | 2017001755 | A1 | 1/2017 |

* cited by examiner

THREE-PHASE ELECTRICAL CONNECTION SYSTEM

CROSS REFERENCE TO RELATED APPLICATIONS

This application is a National Stage of International Application No. PCT/EP2020/062784 filed on May 7, 2020, which claims priority the May 15, 2019 priority date of French Application No. 1905071, the contents of which are hereby incorporated by reference in their entirety.

TECHNICAL FIELD OF THE INVENTION

The present invention relates to a three-phase electrical connection system, using magnetic means to allow mechanical coupling between two of its parts.

PRIOR ART

As is known, a three-phase electrical connection system, as a general rule, consists of an electrical socket and a plug intended to be mechanically and electrically coupled to the socket.

In a three-phase version, the plug and the socket each comprise three electrical phase terminals, an earth terminal and more often than not a neutral terminal.

The three phase terminals are positioned in a delta configuration and the earth terminal may be positioned so as to form a square with the other three terminals. The neutral terminal may be positioned in the center of the square thus formed. In a conventional solution, the user is required to orient the plug with respect to the socket so as to allow the mechanical connection between the two elements, and therefore the electrical connection.

Some magnetic effect-based coupling solutions have already been proposed in the prior art. These solutions involve magnetically attracting the plug toward the socket so as to achieve mechanical bonding between the plug and the socket, and thus form the electrical connection between the electrical terminals present on the plug and the electrical terminals of the socket.

These known magnetic solutions are suitable for single-phase systems and often allow the plug to be connected to the socket, regardless of the orientation of the plug with respect to the socket (360° coupling). Such solutions have been described notably in patent applications WO2012/032230A1, EP2667459A1, FR3012263A1 and WO2017/001755A1. Notably for size reasons, they cannot be adapted to a three-phase system.

Other electrical connection solutions using the magnetic effect are also described in patent applications FR3072216A1, US2011/171837A1 and US2019/009680A1. These solutions aim to provide just a single angular connection position, and for this purpose integrate mechanical poka-yoke means.

The invention aims to provide a three-phase electrical connection system that comprises magnetic means designed to ensure mechanical coupling in a plurality of distinct angular positions of the plug with respect to the socket, so as to allow a reliable electrical connection between an electrical plug and a socket, even without the intervention of a user. The solution of the invention will advantageously work solely by virtue of magnetic means, that is to say limiting the use of a specific mechanical poka-yoke member, as is provided in the prior art.

DESCRIPTION OF THE INVENTION

This aim is achieved by a three-phase electrical connection system comprising a socket, an electrical plug and a two-part magnetic indexing device, a first part fastened to the socket and a second part integral with the plug, the first part and the second part of the magnetic indexing device each comprising:

An annular yoke made of ferromagnetic material and comprising an axis of revolution and at least one revolution support face (200, 300) formed in a plane transverse to its axis of revolution, said face being divided into three identical distinct annular portions, each with an angular range of 120°.

Three identical permanent magnets of a first set, each fastened to a distinct annular portion of the yoke, The three magnets being spaced from one another by a first non-zero regular angular interval, The magnets all having one and the same magnetic orientation, parallel to the axis of revolution, the permanent magnets of the first part being magnetically attracted to the permanent magnets of the second part.

None of the documents in the prior art propose a solution with the aim of allowing a plurality of distinct angular positions in an electrical connection system. Their aim is often to want to limit the number of positions so as to ensure the electrical connection between the corresponding terminals of the socket and the plug. In the invention, all of the magnets are identical and in the same orientation, allowing three angular connection positions that are offset by 120°.

According to one particular feature, the first part of the magnetic indexing device comprises:

- A second set of three other identical permanent magnets, each permanent magnet of the second set being fastened to a distinct annular portion of the support face of the yoke,
- On the yoke, the three permanent magnets of the second set being interposed between two permanent magnets of the first set and spaced from each of them by one and the same second angular interval,
- Said permanent magnets of the second set having a magnetic orientation opposite that of the magnets of the first set.

According to another particular feature, the second part of the magnetic indexing device may also comprise:

- A second set of three other identical permanent magnets, each permanent magnet of the second set being fastened to a distinct annular portion of the support face of the yoke,
- On the yoke, the three permanent magnets of the second set being interposed between two permanent magnets of the first set and spaced from them,
- Said permanent magnets of the second set having a magnetic orientation opposite that of the magnets of the first set.

According to one particular feature, each permanent magnet of the device is in the shape of a ring portion.

According to one particular embodiment, each permanent magnet of the first set is formed of a ring portion extending over an angular range chosen to be greater than or equal to 40° and strictly less than 120°.

According to another particular embodiment, characterized in that each permanent magnet of the first set is formed of a ring portion extending over an angular range chosen to be between 55° and 100°.

According to another particular embodiment, each magnet of the first set is formed of a ring portion extending over an angular range chosen to be between 70° and 90°.

According to one particular feature of the invention, the plug and the socket comprise respective electrical connection members that are arranged, respectively, on the plug and on the socket so as to connect to one another in three distinct angular positions of the plug with respect to the socket, the three angular positions being offset from one another by 120°.

According to one particular feature, the plug comprises three first electrical phase terminals forming an equilateral triangle between them.

According to another particular feature, the plug comprises an electrical earth terminal positioned in the center of said triangle.

According to another particular feature, the plug comprises an electrical neutral terminal.

According to another particular feature, the socket comprises three electrical phase terminals, forming, between them, an equilateral triangle identical to that of the plug, and positioned so as to allow the plug to be connected to the socket in three angular positions, each offset by 120°.

According to another particular feature, the socket comprises an electrical neutral terminal, duplicated three times and each arranged so as to allow the plug to be connected to the socket in three angular positions, each offset by 120°.

According to another particular feature, the plug bears at least one electrical data transfer terminal and the socket comprises a data transfer terminal duplicated three times and each arranged so as to allow the plug to be connected to the socket in three angular positions, each offset by 120°.

BRIEF DESCRIPTION OF THE FIGURES

Other features and advantages will become apparent in the following detailed description, in connection with the figures listed below.

DETAILED DESCRIPTION OF AT LEAST ONE EMBODIMENT

The three-phase electrical connection system of the invention consists of an electrical plug F intended to be connected to an electrical appliance APP and an electrical socket S intended to be connected to an electric power source ALIM and to which the plug F is electrically connected. As a general rule, the socket S is fixed and the plug F is moved toward the socket so as to allow connection.

The socket S and the plug F advantageously have a cylindrical housing.

The system of the invention also comprises a magnetic indexing device 1 having two magnetic parts 2, 3, called first part 2 and second part 3. The first part 2 is fastened to the socket S and the second part 3 is integral with the plug F. It will be seen below that the magnetic architecture of the magnetic indexing device is hexapolar. Each of the two parts is housed in the respective housing of the socket S and of the plug F.

In the solution of the invention, the two magnetic parts are used to ensure at least mechanical coupling of the plug F against the socket S. The electrical connection of the terminals of the plug F to the terminals of the socket S may be formed at the same time as the mechanical coupling or in a subsequent phase. In other words, the solution of the invention at least allows the plug to adopt a stable mechanical position with respect to the socket so that said plug is electrically connected to the socket, while complying with the electrical connection conventions of a three-phase electrical system.

The magnetic indexing device of the invention is intended to make it possible to position the plug F with respect to the socket S in three distinct angular positions, each offset by 120°.

The electrical connection solution is for its part suitable for ensuring an electrical connection between the electrical terminals of the plug F and those of the socket, in any one of the three angular positions (one of the three angular positions) adopted by the plug F with respect to the socket S.

Figure 1:
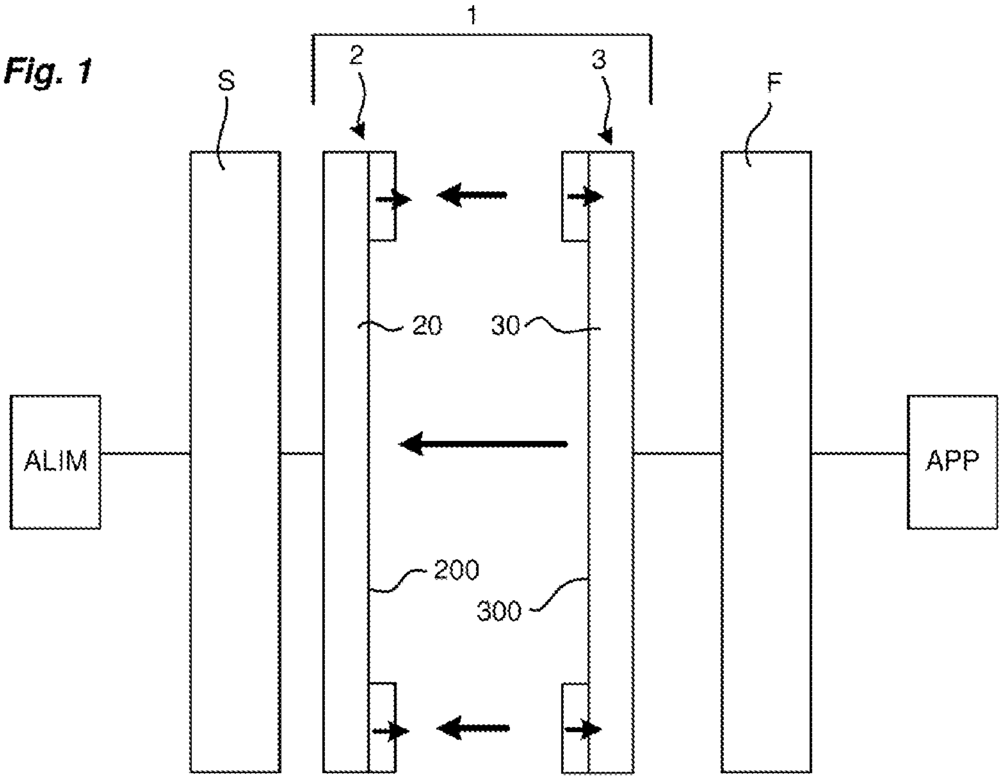
FIG. 1 shows, schematically and in a side view, the underlying principle of the electrical connection system according to the invention.
Figure 2:
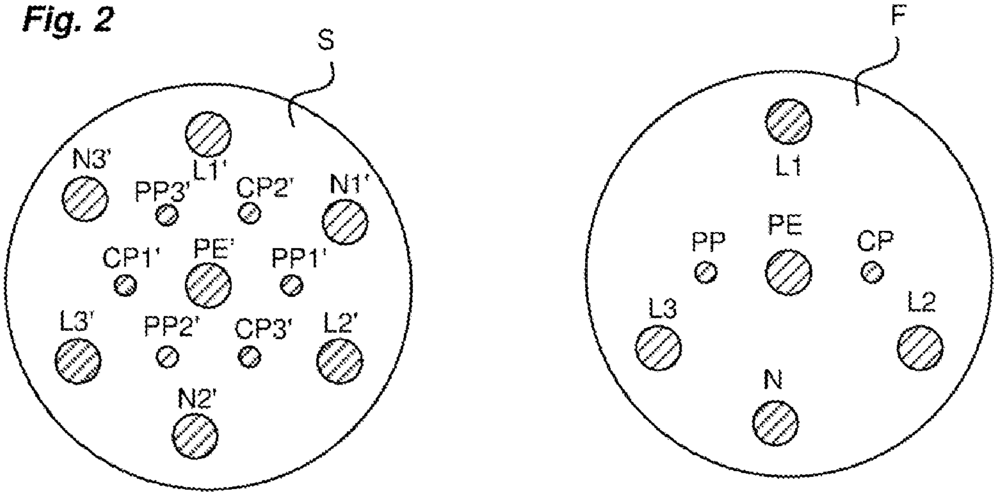
FIG. 2 shows, in a front view, the socket and the plug, respectively, used in the system of the invention.

As shown in FIG. 2, in order to allow the plug F to be able to be positioned in three distinct positions offset by 120°, some electrical terminals present on the socket S are duplicated three times.

By way of example, in a non-limiting manner, on the plug F side, there are thus:

- Three electrical phase terminals L1, L2, L3, positioned at the three vertices of an equilateral triangle;
- A single electrical earth terminal PE positioned in the center of said triangle;
- A single electrical neutral terminal N;
- Possibly two data transfer terminals PP, CP;

And on the socket S side, there are thus:

- Three electrical phase terminals L1', L2', L3' positioned at the three vertices of an equilateral triangle identical to that of the plug F so as to allow the plug F to be connected in three angular positions offset by 120°;
- A single electrical earth terminal PE' positioned in the center of the triangle formed by the three phase terminals;
- Three electrical neutral terminals N1', N2', N3' forming, between them, a second equilateral triangle and each positioned so as to allow the neutral terminal of the plug to be connected, in each of the three angular orientations of the plug F with respect to the socket S;
- Two data transfer terminals, duplicated three times (CP1', CP2', CP3' and PP1', PP2', PP3') and positioned appropriately so as to allow the two data transfer terminals of the plug F to be connected, in each of the three angular orientations of the plug F with respect to the socket S.

Of course, other configurations could be contemplated. The neutral terminal could be placed in the center and the earth terminal could be duplicated on the socket side.

It should be noted that, in order to avoid connecting the neutral to a phase, the neutral terminals are advantageously offset appropriately with respect to the phase terminals so as to form a natural poka-yoke mechanism.

By way of example, the electrical terminals used in the plug and the socket may be pinch terminals or flat contacts.

The two magnetic parts 2, 3 of the indexing device are intended to attract one another through the effect of magnetic attraction, for example through plastic housings.

Figure 3A:
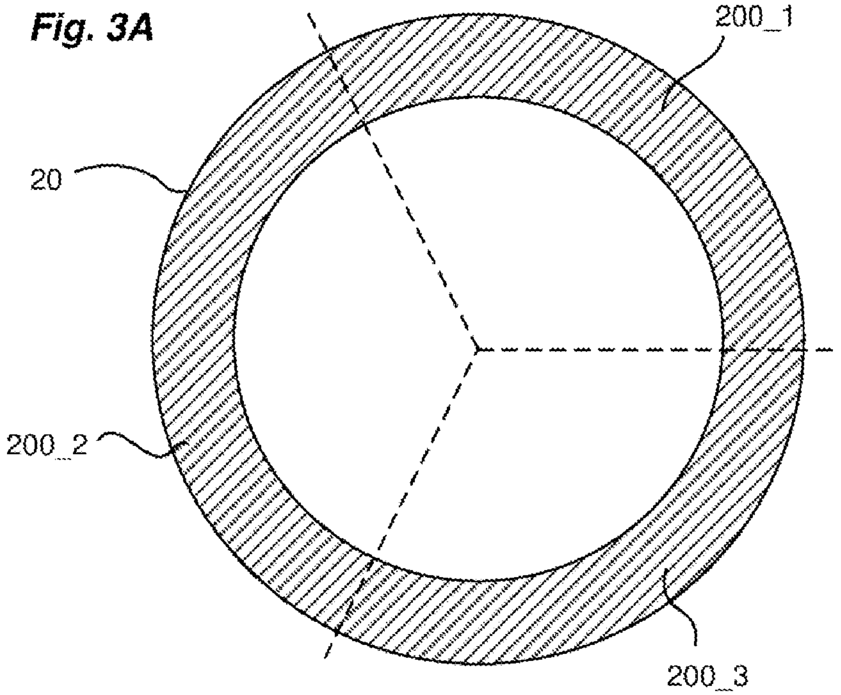
FIGS. 3A and 3B show a front view of the magnetic yokes of the two magnetic parts of the system of the invention.
Figure 3B:
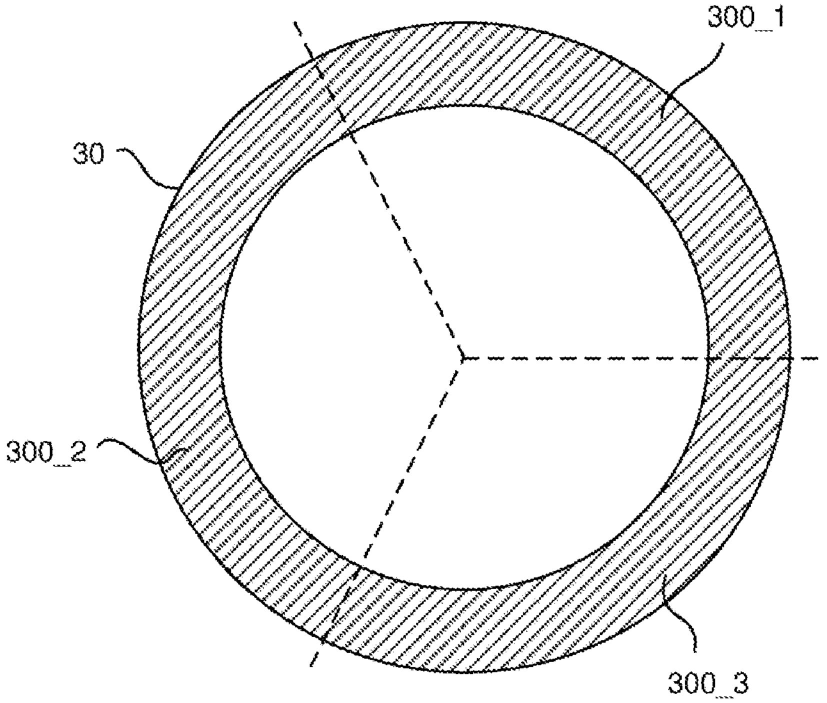

The two parts 2, 3 each comprise a yoke 20, 30, preferably made of a ferromagnetic material (hereinafter magnetic yoke). The two yokes 20, 30 are advantageously of identical shape and composition (the same material). Each magnetic yoke 20, 30 is produced in the form of a ring, advantageously with a rectangular cross section. The ring is therefore advantageously flat and thus has two opposing transverse annular faces about its axis of revolution (X). This axis of revolution is parallel to the direction in which the plug F is brought toward the socket S in order to make the connection. At least one of the two faces is flat and is intended to support permanent magnets. This is designated as a support face 200, 300 for each of the yokes 20, 30. As shown in FIGS. 3A and 3B, this support face 200, 300 is divided between three adjacent identical annular portions (200_1, 200_2, 200_3 and 300_1, 300_2, 300_3) each extending over an angular range of 120°, so as to occupy the entire circumference of the yoke. The three annular portions are referenced first annular portion, second annular portion and third annular portion for each yoke.

By way of example, the yoke 20, 30 may have a thickness of between 2 mm and 8 mm.

Likewise, the yoke 20, 30 may have an internal diameter D1 of between 40 mm and 120 mm and an external diameter D2 of between 50 mm and 140 mm.

It is then possible to distinguish between the various magnetic configurations listed below. The first configuration is a minimal configuration, and the following configurations are successive improvements.

Figure 4A:
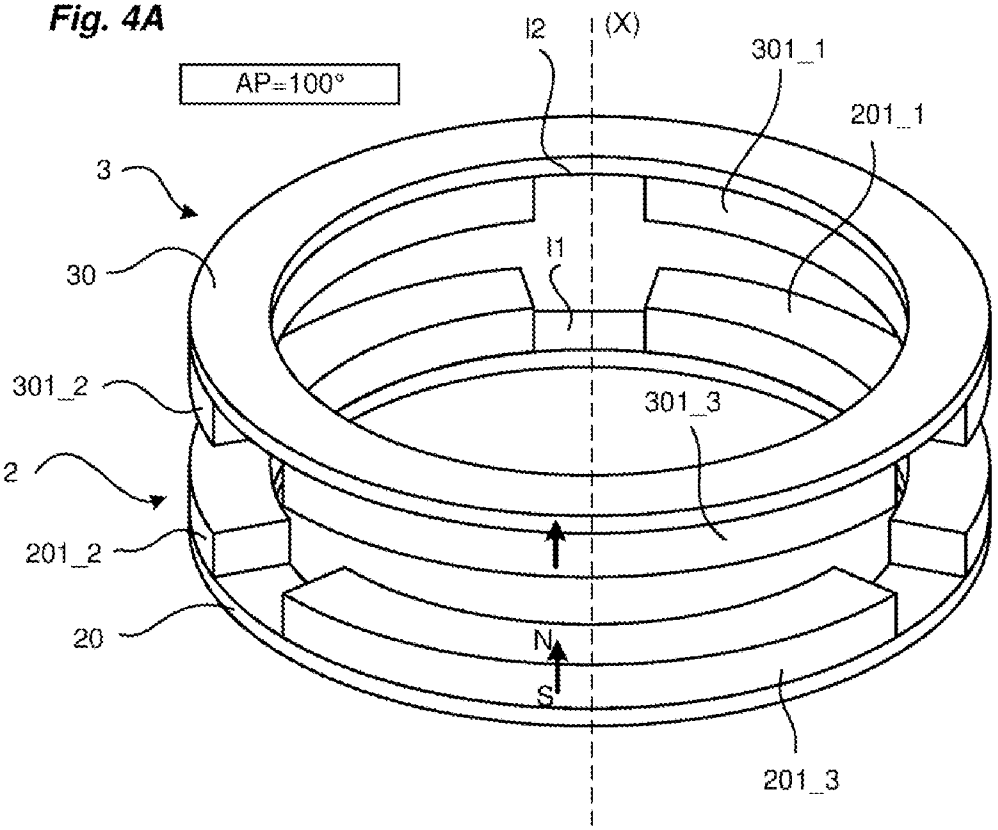
FIGS. 4A to 4C show three variants of the first configuration of the magnetic indexing device used in the system of the invention.
Figure 4B:
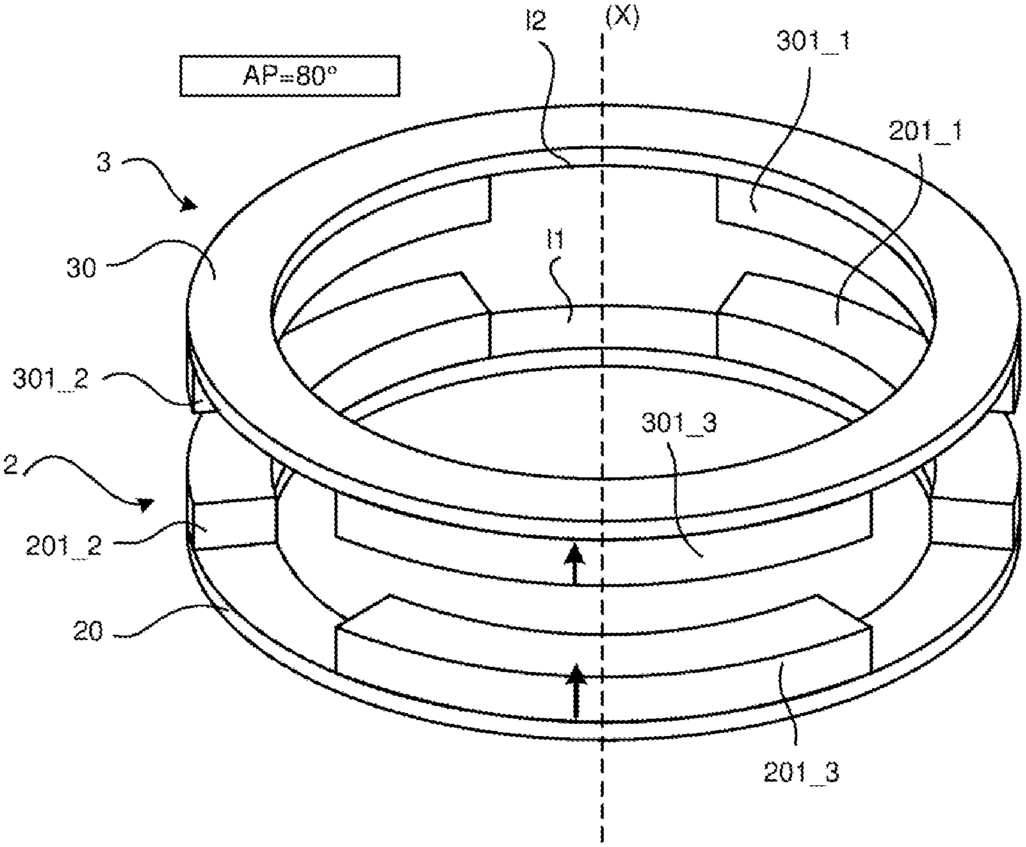
Figure 4C:
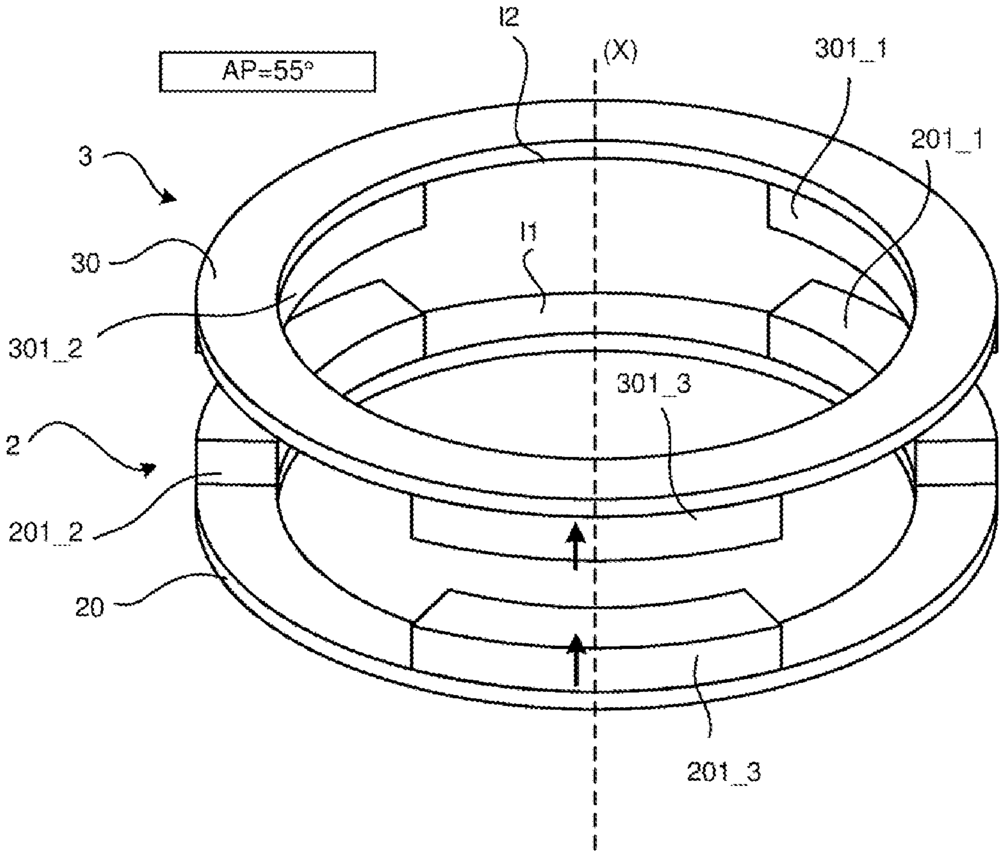

First Configuration—FIGS. 4A to 4C

In this configuration, each yoke 20, 30 bears a first set of three identical permanent magnets 201_1, 201_2, 201_3, 301_1, 301_2, 301_3.

The magnets associated with the first part and those associated with the second part are advantageously of identical form and composition.

For each magnetic part 2, 3, a first permanent magnet 201_1, 301_1 is fastened to the first annular portion 200_1, 300_1 of the support face, a second permanent magnet 201_2, 301_2 is fastened to the second annular portion 200_2, 300_2 of the support face and a third permanent magnet 201_3, 301_3 is fastened to the third annular portion 200_3, 300_3 of the support face.

On each yoke, the permanent magnets are fastened to their support face so as to exhibit a magnetic orientation (by convention in the South-North direction) parallel to the axis of revolution (X) of the yoke. The permanent magnets of the first part and those of the second part are oriented so as to magnetically attract. They thus have a polar face in contact with the support face. In all of the configurations described, each magnet will be fastened by applying one of its two polar faces (in its magnetic orientation) to the support face of the magnetic yoke with which it is integral. In the appended figures, by convention, the magnetic orientation of a permanent magnet is represented by an arrow oriented in the South-North direction.

Each permanent magnet may be formed in the shape of a ring portion having a radius of curvature identical to that of the yoke so as to match the shape thereof and a radial dimension that is constant over their entire angular range and identical to that of the yoke.

On each yoke 20, 30, the permanent magnets are spaced from one another by a non-zero regular interval I1, I2 (the magnets are not in contact). The angular interval is defined by an angular range around the axis of revolution (X) and is identical for the two magnetic parts.

In this first configuration, each magnet may extend over a determined angular range on the annular portion. Since, on each yoke, the magnets are not in contact with one another, they may be formed over an angular range strictly less than 120°, so as to maintain a non-zero angular interval with each of the adjacent magnets, and greater than 40°. They may need to be elongate enough to ensure precise magnetic positioning between the two parts 2, 3.

By way of example and in a non-limiting manner, it is possible to distinguish between the following various embodiments:

On the two yokes 20, 30, the magnets may each extend over one and the same angular range AP of 100° on their annular portion (FIG. 4A);

On the two yokes, the magnets may each extend over one and the same angular range AP of 80° on their annular portion (FIG. 4B);

On the two yokes, the magnets may each extend over one and the same angular range AP of 55° on their annular portion (FIG. 4C).

In this configuration, on each magnetic part, the angular interval I1, I2 between two magnets of course depends on the size given to the magnets.

Figure 5A:
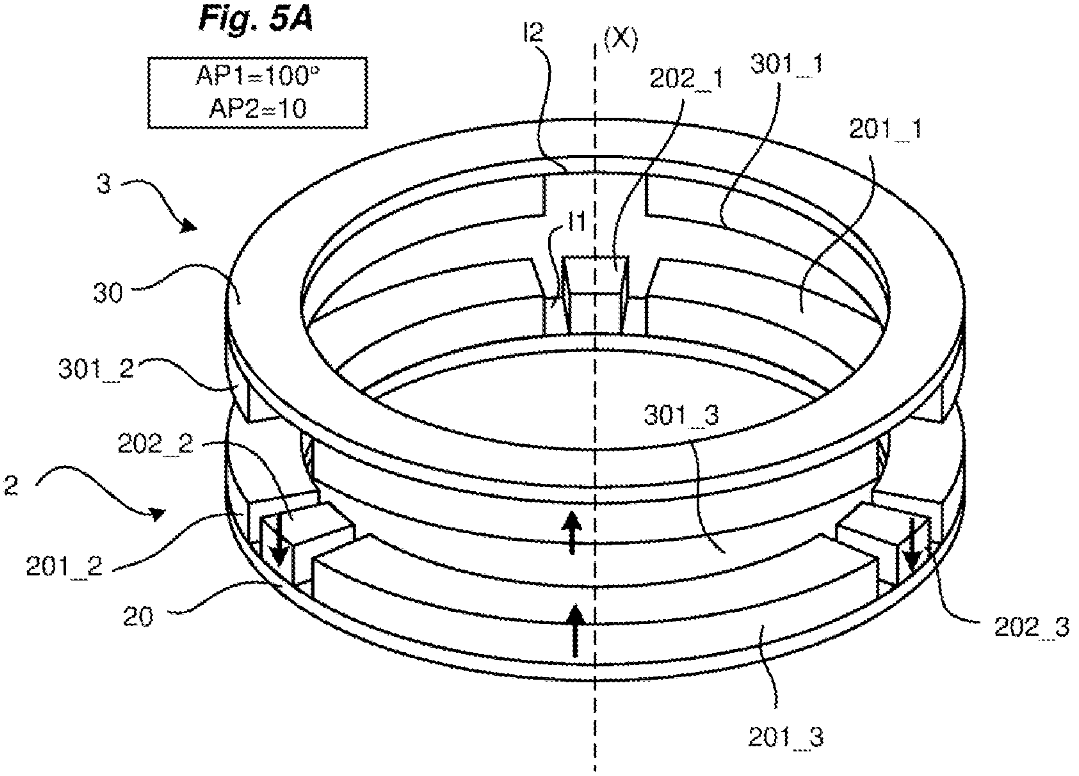
FIGS. 5A to 5C show three variants of the second configuration of the magnetic indexing device used in the system of the invention.
Figure 5B:
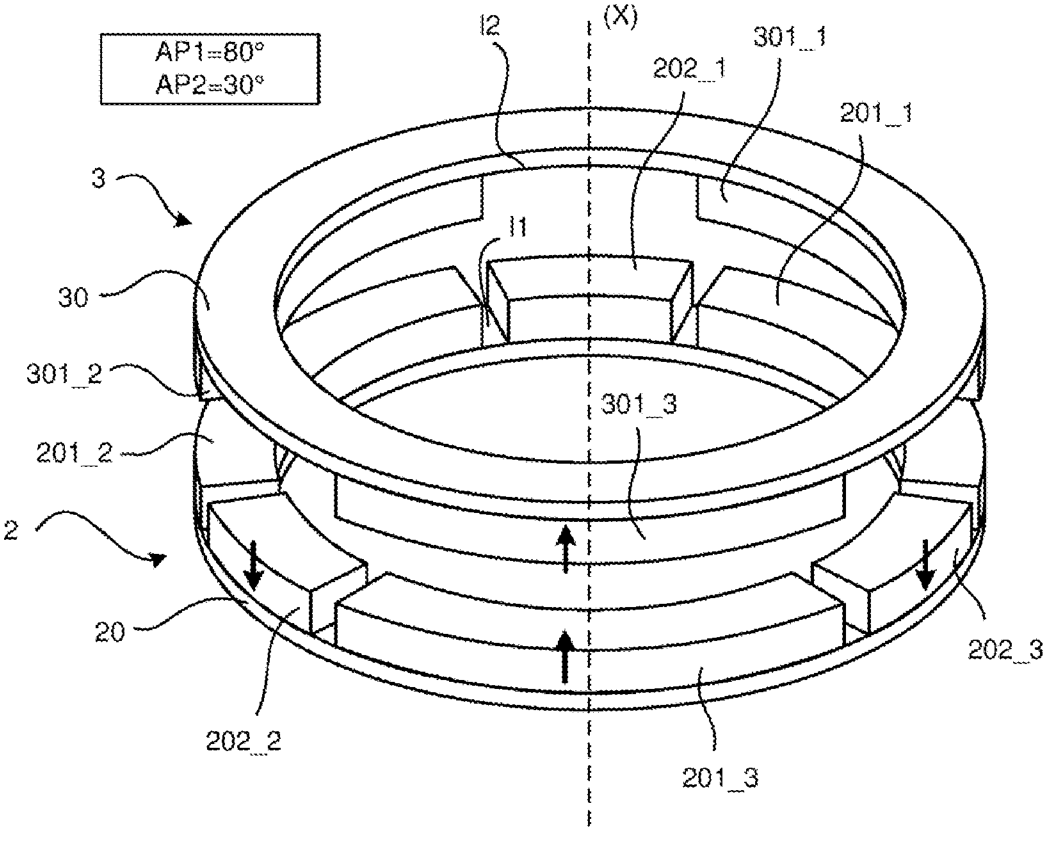
Figure 5C:
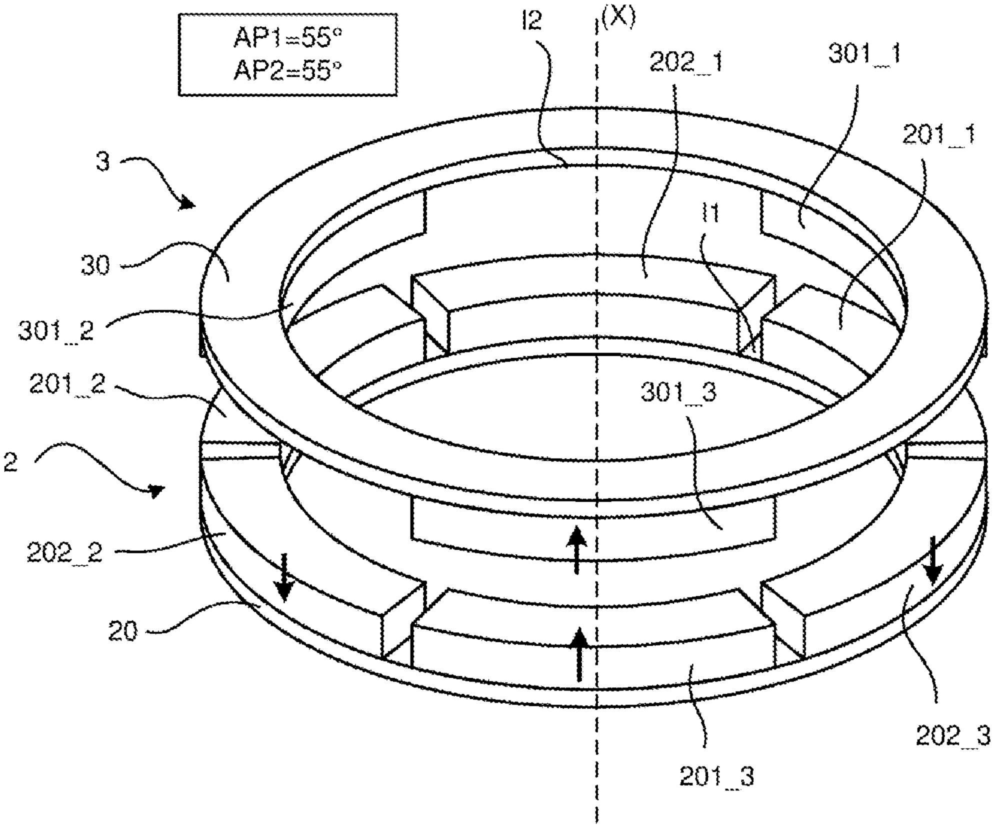

Second Configuration—FIGS. 5A to 5C

In comparison with the first configuration, this second configuration adds, to the first part 2 only of the magnetic indexing device, a second set of three identical permanent magnets 202_1, 202_2, 202_3. The second part 3 remains identical to that described for the first configuration above.

These three magnets 202_1, 202_2, 202_3 are each fastened to a distinct annular portion 200_1, 200_2, 200_3 of the yoke, on the same face as the three magnets of the first set.

Each of these three new magnets is interposed between two magnets of the first set, leaving a non-zero regular angular interval with these two magnets of the first set.

Each permanent magnet of this second set may be formed in the shape of a ring portion having a radius of curvature identical to that of the yoke so as to match the shape thereof and a radial dimension that is constant over their entire angular range and identical to that of the yoke.

All three of them are fastened to their support face so as to exhibit one and the same magnetic orientation parallel to the axial axis of revolution (X) and opposite that of the magnets of the first set.

They advantageously have a thickness (defined in the axial direction) identical to that of the magnets of the first set of the first part.

They extend over an angular range less than or equal to that of the magnets of the first set of the first part, the assembly formed by a magnet of the first set, a magnet of the second set and two non-zero angular intervals being equal to 120°.

By way of example, it is possible to distinguish between the following various embodiments:

On the first part, the permanent magnets 201_1, 201_2, 201_3 of the first set may each extend over an angular range AP1 of 100° on their annular portion and the permanent magnets 202_1, 202_2, 202_3 of the second set may each extend over an angular range AP2 of 10° (FIG. 5A). The regular angular interval I1 is therefore close to 5° between two adjacent magnets. The second part 3 has only the first set of three permanent magnets 301_1, 301_2, 301_3, which are identical to the permanent magnets of the first set of the first part 2.

The permanent magnets 201_1, 201_2, 201_3 of the first set may each extend over an angular range AP1 of 80° on their annular portion and the permanent magnets 202_1, 202_2, 202_3 of the second set may each extend over an angular range AP2 of 30° (FIG. 5B). The regular angular interval I1 is therefore close to 5° between two adjacent magnets. The second part 3 has only the first set of three permanent magnets 301_1, 301_2, 301_3, which are identical to the permanent magnets of the first set of the first part 2.

The permanent magnets 201_1, 201_2, 201_3 of the first set may each extend over an angular range AP1 of 55° on their annular portion and the permanent magnets 202_1, 202_2, 202_3 of the second set may each extend over an angular range AP2 of 55° (FIG. 5C). The regular angular interval I1 is therefore close to 5° between two adjacent magnets. The second part 3 has only the first set of three permanent magnets 301_1, 301_2, 301_3, which are identical to the permanent magnets of the first set of the first part 2.

In each of the embodiments, the permanent magnets of the second part are chosen with the same angular range as that of the permanent magnets of the first part.

As a variant to this second configuration, it is of course possible to reverse the two magnetic architectures. The second set of three permanent magnets is then fastened to the second magnetic part 3, these magnets being interposed between the magnets of the first set of the second part 3, and the first magnetic part then remains with a configuration with a single first set of three permanent magnets.

Figure 6A:
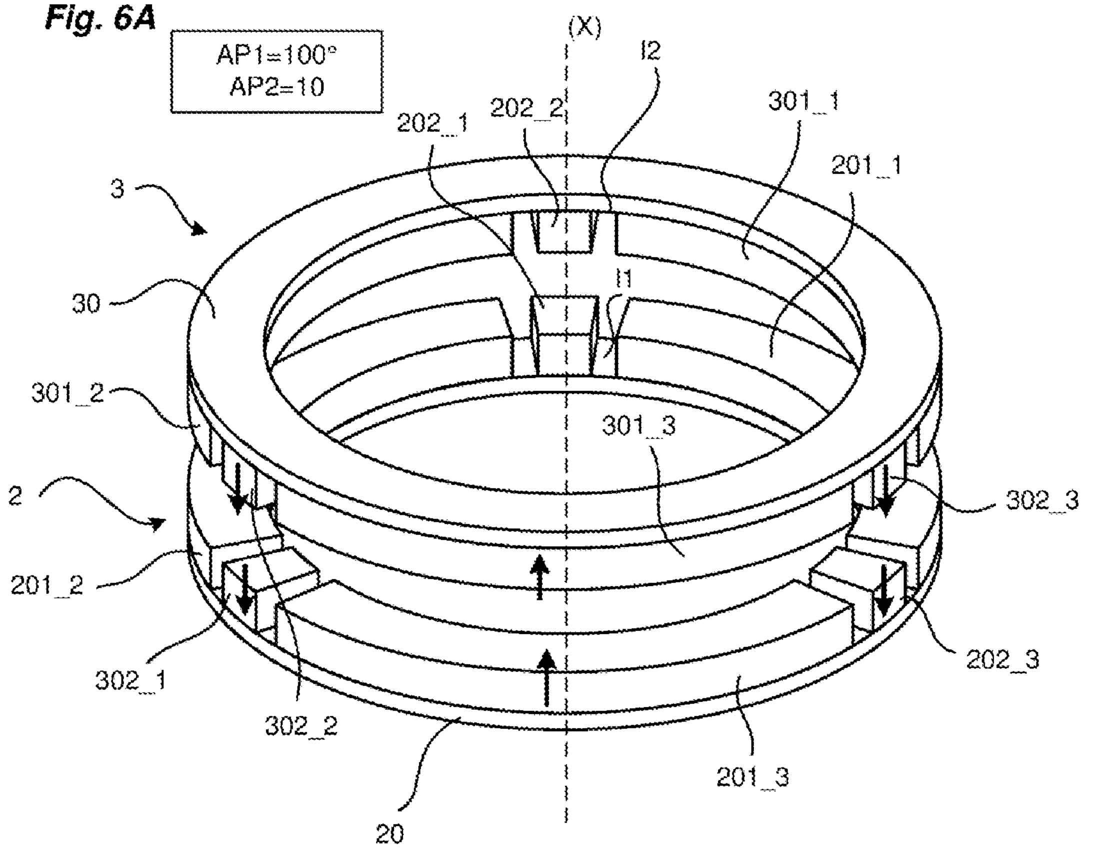
FIGS. 6A to 6C show three variants of the third configuration of the magnetic indexing device used in the system of the invention.
Figure 6B:
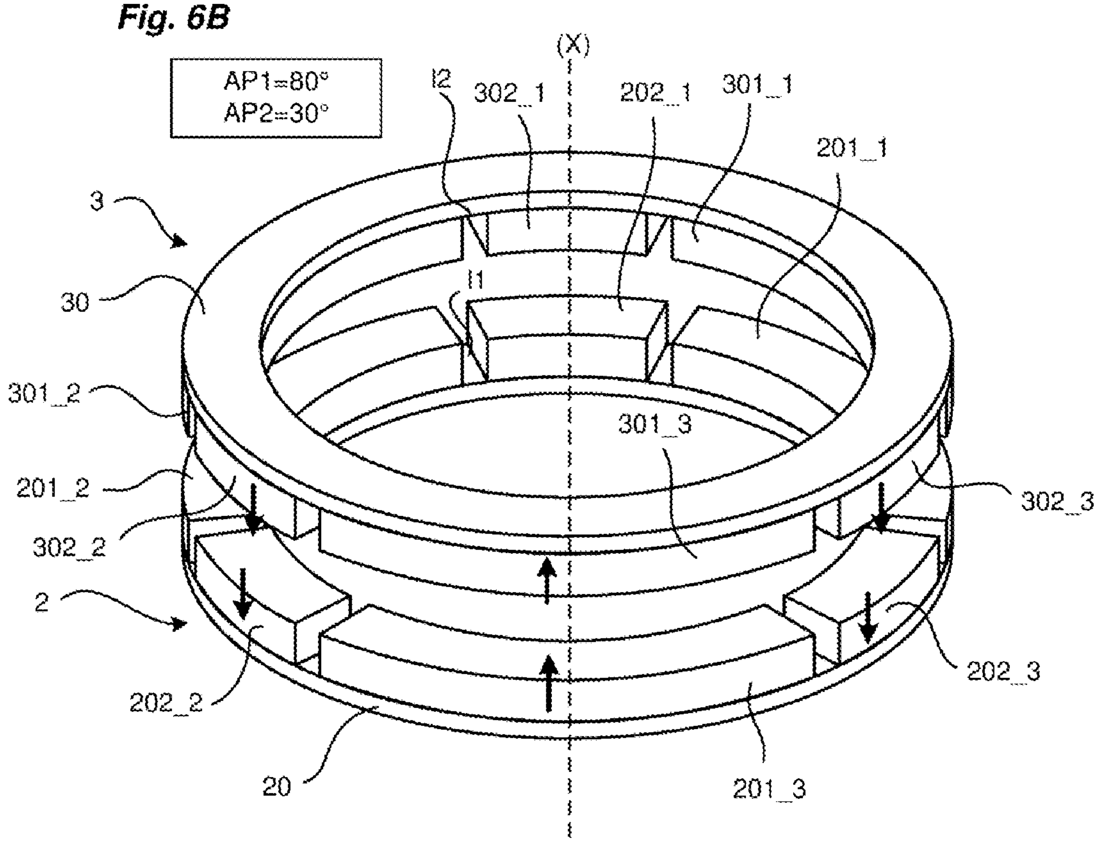
Figure 6C:
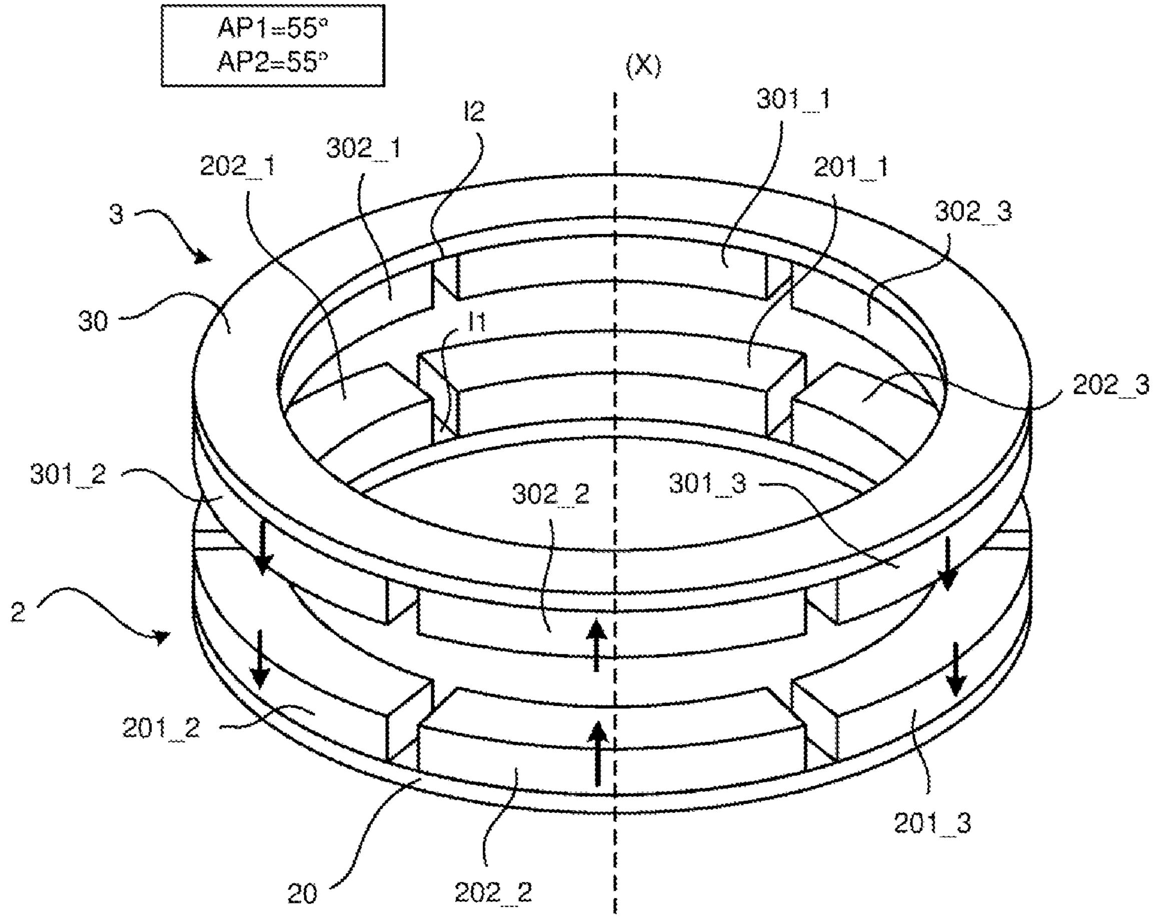

Third Configuration—FIGS. 6A to 6C

In comparison with the second configuration, this third configuration adds, to the second part 3 of the magnetic indexing device, a second set of three identical permanent magnets 302_1, 302_2, 302_3. The first part remains identical to that described above for the second configuration.

In the same way as for the second configuration, these three additional magnets are each fastened to a distinct annular portion of the yoke 30 of the second part 3, on the same face as the three magnets of the first set.

Each of these three new magnets is interposed between two magnets of the first set, leaving a non-zero regular angular interval I2 with these two magnets of the first set.

Each permanent magnet 302_1, 302_2, 302_3 of this second set may be formed in the shape of a ring portion having a radius of curvature identical to that of the yoke so as to match the shape thereof and a radial dimension that is constant over their entire angular range and identical to that of the yoke.

All three of them are fastened to their support face so as to exhibit one and the same magnetic orientation parallel to the axial axis of revolution and opposite that of the magnets of the first set of the second part 3.

They advantageously have a thickness (defined in the axial direction) identical to that of the magnets of the first set of the second part 3.

They extend over an angular range less than or equal to that of the magnets of the first set of the second part.

By way of example, considering that the first part 2 remains in the second configuration described above, it is possible to distinguish between the following various embodiments:

The permanent magnets 301_1, 301_2, 301_3 of the first set may each extend over an angular range AP1 of 100° on their annular portion and the permanent magnets 302_1, 302_2, 302_3 of the second set may each extend over an angular range AP2 of 10° (FIG. 6A). The regular angular interval I2 is therefore close to 5° between two adjacent magnets. The first part 2 has the same configuration with magnets oriented so as to attract those of the second part 3.

The permanent magnets 301_1, 301_2, 301_3 of the first set may each extend over an angular range AP1 of 80° on their annular portion and the permanent magnets 302_1, 302_2, 302_3 of the second set may each extend over an angular range AP2 of 30° (FIG. 6B). The regular angular interval is therefore close to 5° between two adjacent magnets. The first part 2 has the same configuration with magnets oriented so as to attract those of the second part 3.

The permanent magnets 301_1, 301_2, 301_3 of the first set may each extend over an angular range AP1 of 55° on their annular portion and the permanent magnets 302_1, 302_2, 302_3 of the second set may each extend over an angular range AP2 of 55° (FIG. 6C). The regular angular interval is therefore close to 5° between two adjacent magnets. The first part 2 has the same configuration with magnets oriented so as to attract those of the second part 3.

Regardless of the embodiment and the configuration, the magnets 201_1, 201_2, 201_3 of the first set of the first part 2 and the magnets 301_1, 301_2, 301_3 of the first set of the second part 3 are always chosen with one and the same angular range, and the permanent magnets 202_1, 202_ 2, 202_3 of the second set of the first part 2 (if they are present) and the permanent magnets 302_1, 302_2, 302_3 of the second set of the second part 3 (if they are present) are always chosen with one and the same angular range. Likewise, regardless of the embodiment and the configuration, the angular interval I1, I2 between two adjacent magnets is non-zero, regular and chosen to be identical. By way of example, it is chosen to be between 2° and 10° and is of course suited to the size of the magnets that are chosen.

By way of example, all of the magnets may have a thickness of between 2 mm and 10 mm.

Figure 7:
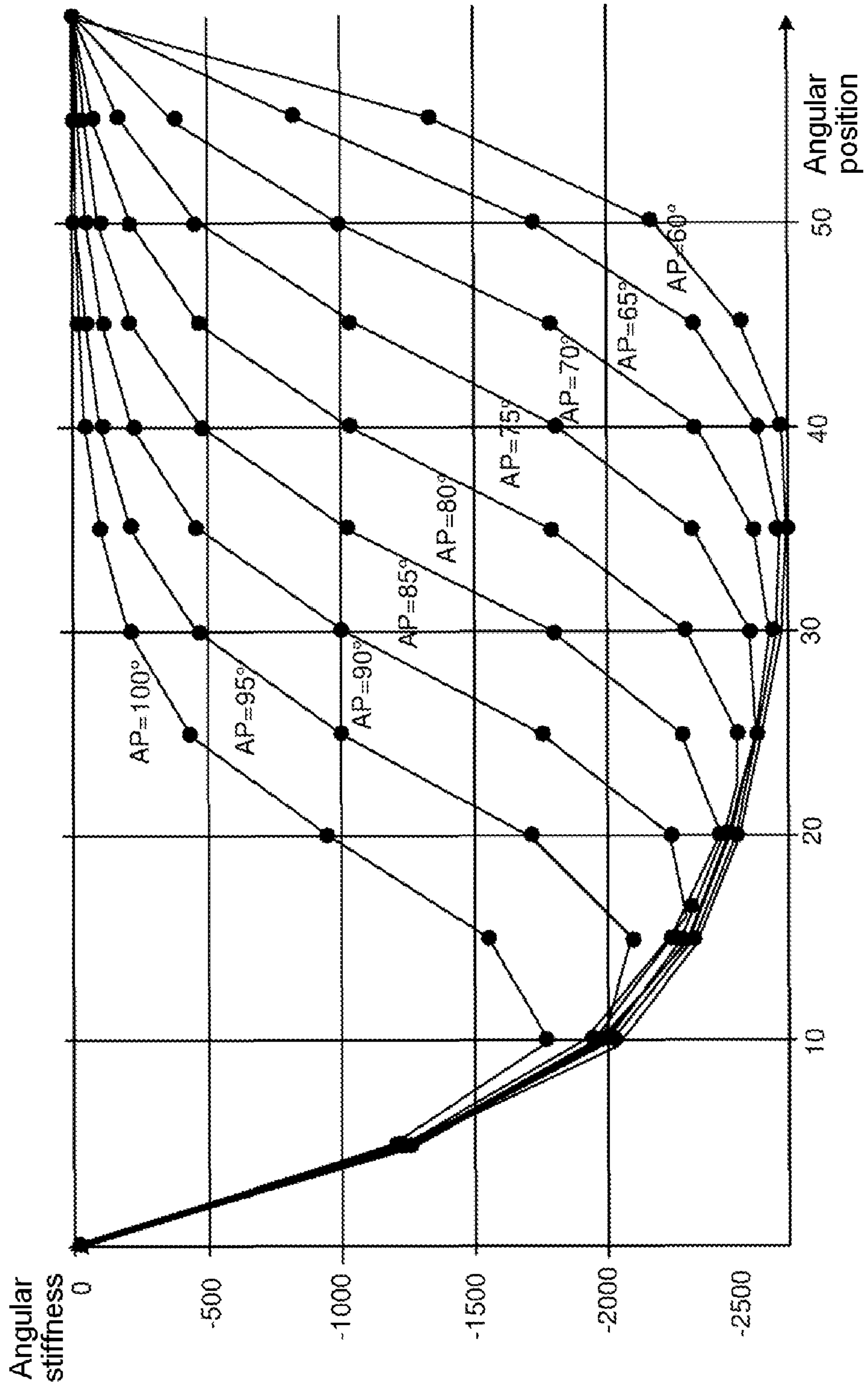
FIG. 7 shows a graph illustrating the dimensional features of the system of the invention.

FIG. 7 shows a graph illustrating the angular stiffness exerted by the first magnetic part 2 on the second magnetic part 3, for various sizes of magnets (angular range AP) of the first set when the system is in the first configuration described above, that is to say with a single set of three magnets per yoke 20, 30. The dimensional configuration was as follows:

AG (=air gap, that is to say distance between the two magnetic parts)=2 mm; HY (=yoke thickness, dimension in the axial direction)=4 mm; HM (=magnet thickness, dimension in the axial direction)=6 mm; TH (=magnet & yoke width, radial dimension)=8 mm; AP (=angular range of each magnet)=55° to 100°.

It may thus be seen that the angular stiffness (on the ordinate) is always highest for large magnets, regardless of the angular position adopted by the plug about its axis with respect to the socket.

The described solution thus has numerous advantages, including:

- It allows mechanical coupling through the magnetic effect, in three distinct angular positions each offset by 120°, by virtue of the implementation of a hexapolar magnetic architecture;
- It is able to be adapted easily to the electrical connection of a plug to an electrical socket, and makes it possible to ensure a connection, in a plurality of positions, without the intervention of a user;

It is easy to manufacture;

It is compact, since the use of annular yokes makes it possible to free up the axial internal space for electrical connections.

The system of the invention is notably perfectly suitable for being used in an electrical installation for recharging an electric vehicle, such as that described in patent application WO2017/216458 A1. This installation has the particular feature of making it possible to connect a plug to an electrical socket without the intervention of the user, by guiding the plug toward the socket through the magnetic effect.

The invention claimed is:

1. An apparatus comprising a three-phase electrical connection system, said system comprising a socket, an electrical plug, and a two-part magnetic indexing device, wherein said two-part magnetic indexing device comprises a first part and a second part, wherein said first part is fastened to said socket and said second part is integral with said plug, wherein said first part and said second part each comprise an annular yoke and a first set of permanent magnets, wherein said first set comprises three permanent magnets, wherein said annular yoke comprises ferromagnetic material, an axis of revolution, and at least one revolution support face, wherein said support face is formed in a plane transverse to said axis of revolution, wherein said face is divided into three distinct portions, each of which extends one-hundred and twenty degrees of arc, wherein three magnets of said first set are attached to a distinct portion of said yoke, wherein said magnets are spaced from one another by a first non-zero angular interval, wherein said magnets all have said same magnetic orientation parallel to said axis of revolution, wherein permanent magnets of said first part are magnetically attracted to said permanent magnets of said second part, and wherein, when said plug is at any one of a first, second, and third angular position relative to said socket, said plug forms an electrical connection with said socket, said first, second, and third angular positions being offset from each other by 120°.

2. The apparatus of claim 1, wherein said first part further comprises a second set of three identical permanent magnets, wherein each permanent magnet of said second set is fastened to a distinct portion of said support face of said yoke, wherein, on said yoke, said permanent magnets of said second set are interposed between corresponding permanent magnets of said first set and spaced from each of said corresponding permanent magnets of said first set by a second angular interval, and wherein said permanent magnets of said second set have a magnetic orientation that is opposite that of said magnets of said first set.

3. The apparatus of claim 1, wherein said second part comprises a second set of three permanent magnets, wherein each permanent magnet of said second set is fastened to a distinct portion of said support face of said yoke, wherein, on said yoke, said three permanent magnets of said second set are interposed between corresponding permanent magnets of said first set and spaced from said corresponding permanent magnets, and wherein said permanent magnets of said second set have a magnetic orientation that is opposite that of said magnets of said first set.

4. The apparatus of claim 3, wherein each permanent magnet of said first set is formed from a portion of a ring, wherein said portion extends over an angular range that is greater than forty degrees and less than one-hundred and twenty degrees of arc.

5. The apparatus of claim 1, wherein each permanent magnet of said device has a shape that is that of a portion of a ring.

6. The apparatus of claim 5, wherein each permanent magnet of said first set is formed from a ring portion that extends over an angular range that is between fifty-five degrees of arc and one-hundred degrees of arc.

7. The apparatus of claim 5, wherein each magnet of said first set is formed from a ring portion that extends over an angular range that is between seventy degrees of arc and ninety degrees of arc.

8. The apparatus of claim 1, wherein said plug and said socket comprise respective electrical connection members that are arranged, respectively, on said plug and on said socket so as to connect to one another in three distinct angular positions of said plug with respect to said socket, said three angular positions being offset from one another by one-hundred and twenty degrees of arc.

9. The apparatus of claim 8, wherein said plug comprises three first electrical phase terminals that form an equilateral triangle between them.

10. The apparatus of claim 9, wherein said plug comprises an electrical ground terminal positioned at the center of said triangle.

11. The apparatus of claim 9, wherein said plug comprises an electrically neutral terminal.

12. The apparatus of claim 9, wherein said socket comprises three electrical phase terminals that form an equilateral triangle identical to that of said plug and that is positioned so as to allow said plug to be connected to said socket in three angular positions that are offset from each other by one-hundred and twenty degrees of arc.

13. The apparatus of claim 12, wherein said socket comprises three electrically neutral terminals that are arranged so as to allow said plug to be connected to said socket in three angular positions, each offset by one-hundred and twenty degrees of arc.

14. The apparatus of claim 12, wherein said plug bears at least one electrical data transfer terminal, wherein said socket comprises three data transfer terminals that are arranged so as to allow said plug to be connected to said socket in three angular positions, and wherein said angular positions are offset by one-hundred and twenty degrees of arc.

* * * * *